No. 12,811. REISSUED JUNE 16, 1908.
P. BONVILLAIN.
MACHINE FOR MANIPULATING FOUNDRY MOLDS AND THE LIKE.
APPLICATION FILED JAN. 11, 1908.
4 SHEETS—SHEET 1.
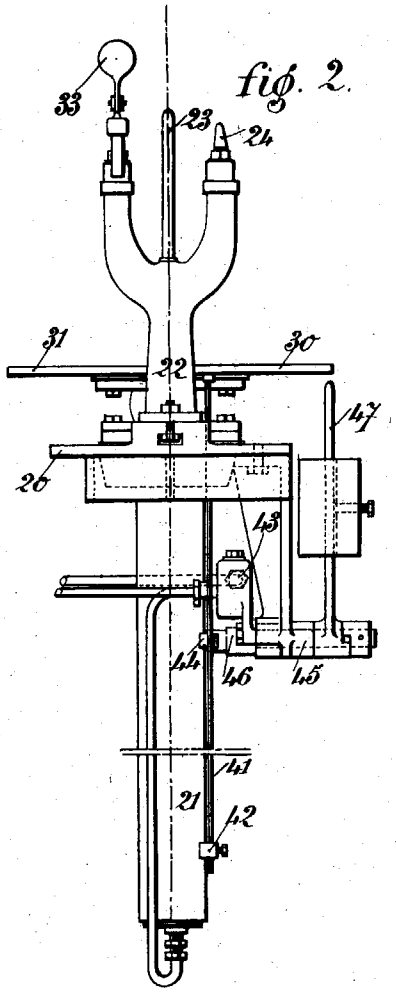
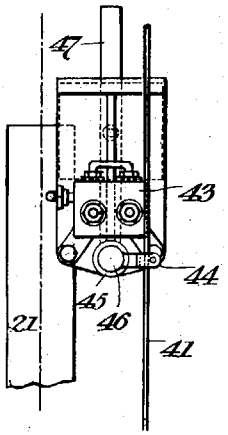
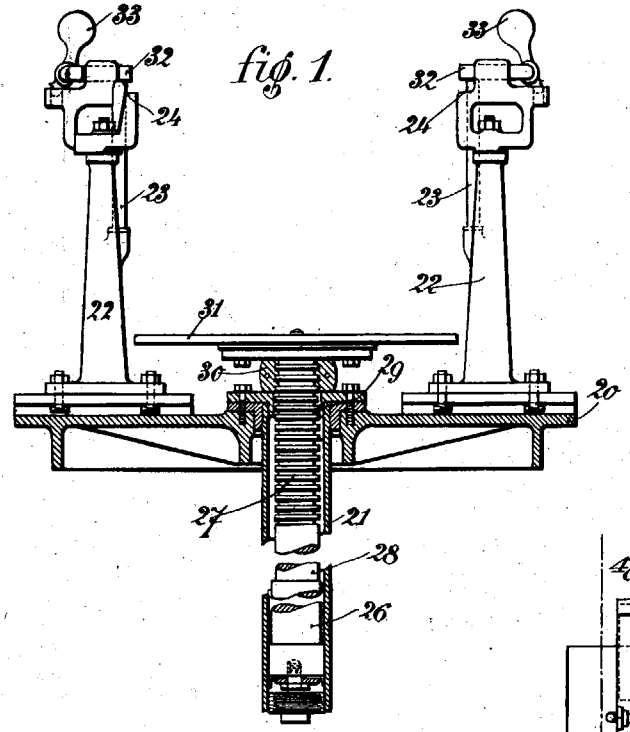
Witnesses:
Harvey L. Lechner
Archworth Martin
Inventor:
Philibert Bonvillain
by atty
Paul Synnestvedt
THE NORRIS PETERS CO., WASHINGTON, D. C.

No. 12,811. REISSUED JUNE 16, 1908.
P. BONVILLAIN.
MACHINE FOR MANIPULATING FOUNDRY MOLDS AND THE LIKE.
APPLICATION FILED JAN. 11, 1908.
4 SHEETS—SHEET 2.
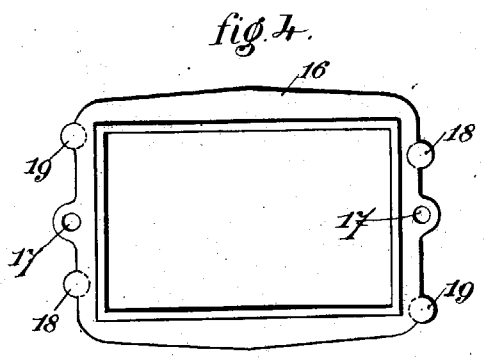
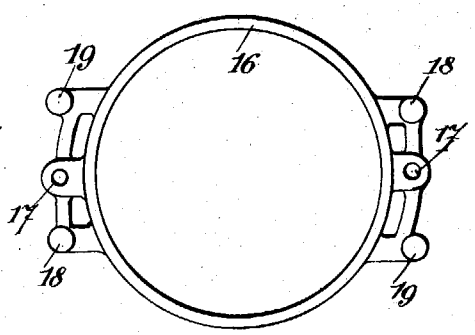
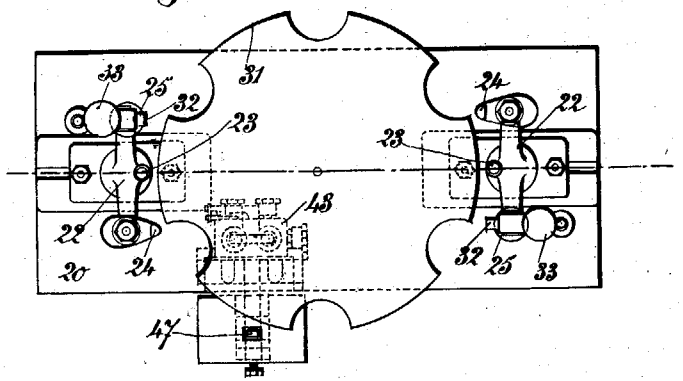
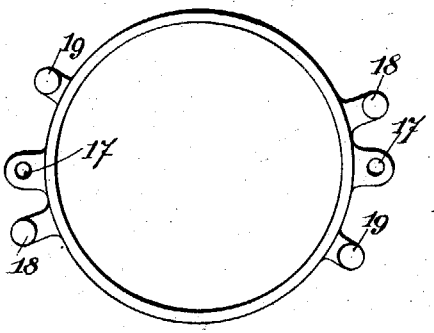
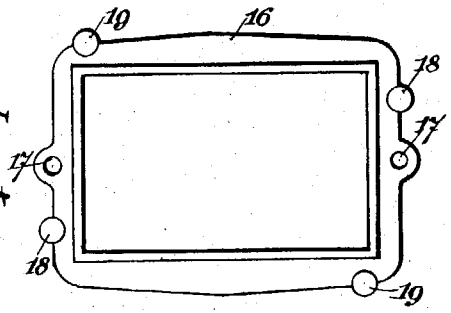
Witnesses:
Harvey L. Lechner
Archworth Martin
Inventor:
Philibert Bonvillain
by atty Paul Synnestvedt
THE NORRIS PETERS CO., WASHINGTON, D. C.

No. 12,811. REISSUED JUNE 16, 1908.

P. BONVILLAIN.

MACHINE FOR MANIPULATING FOUNDRY MOLDS AND THE LIKE.

APPLICATION FILED JAN. 11, 1908.

4 SHEETS—SHEET 3.

Witnesses:
Harvey L. Lechner
Archworth Martin

Inventor:
Philibert Bonvillain
by atty Paul Synnestvedt

THE NORRIS PETERS CO., WASHINGTON, D. C.

No. 12,811. REISSUED JUNE 16, 1908.

P. BONVILLAIN.

MACHINE FOR MANIPULATING FOUNDRY MOLDS AND THE LIKE.

APPLICATION FILED JAN. 11, 1908.

4 SHEETS—SHEET 4.

Witnesses:
Harvey L. Lechner
Archibald Martin

Inventor:
Philibert Bonvillain
by atty
Paul Synnestvedt

THE HORRIS-PETERS CO., WASHINGTON, D. C.

UNITED STATES PATENT OFFICE.

PHILIBERT BONVILLAIN, OF PARIS, FRANCE, ASSIGNOR TO E. H. MUMFORD COMPANY, OF PHILADELPHIA, PENNSYLVANIA, A CORPORATION OF PENNSYLVANIA.

MACHINE FOR MANIPULATING FOUNDRY-MOLDS AND THE LIKE.

No. 12,811. Specification of Reissued Letters Patent. Reissued June 16, 1908.

Original No. 818,410, dated April 24, 1906, Serial No. 218,628. Application for reissue filed January 11, 1908. Serial No. 410,462.

*To all whom it may concern:*

Be it known that I, PHILIBERT BONVILLAIN, a citizen of the Republic of France, and a resident of Paris, France, have invented certain new and useful Improvements in or Relating to Machines for Manipulating Foundry-Molds and the Like, of which the following is a specification.

The invention relates to a special machine for assembling two or more parts of the same molding box, forming a sand mold made either by hand or by machine-molding processes so that they superpose each other perfectly accurately in order to avoid side displacement in the parts of the mold which would alter more or less the shape of the castings.

This said machine is so devised as to allow at the same operation the pushing out from the molding-box of the blocks of sand formed by the assembled parts of a sand mold, so that the same molding box can be reutilized indefinitely to make similar molds, which constitutes an enormous saving in foundry practice.

Figure 8:
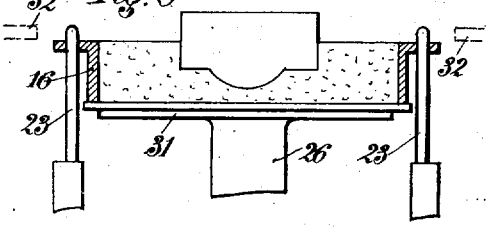
Figure 9:
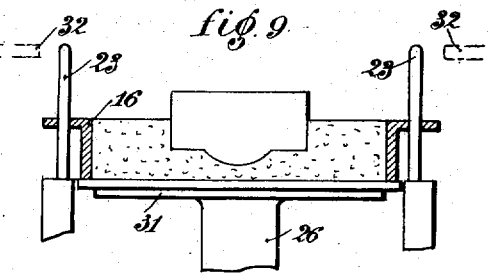
Figure 10:
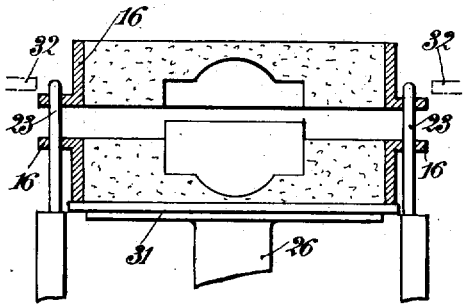
Figure 11:
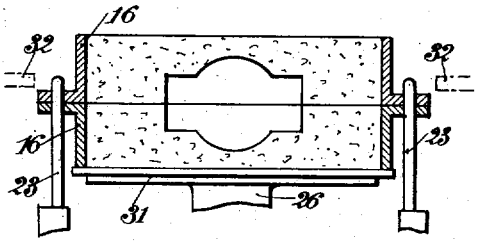
Figure 12:
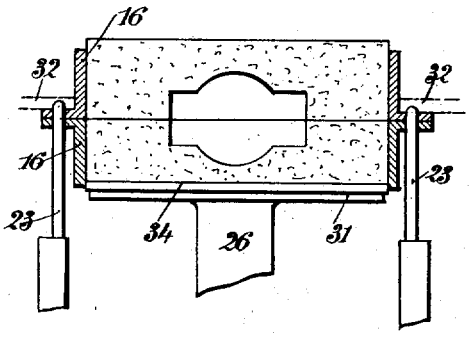
Figure 13:
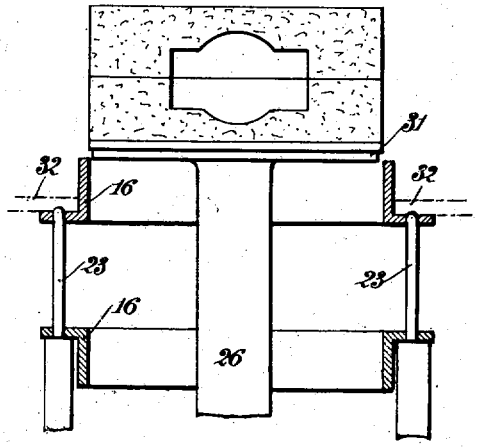
Figure 14:
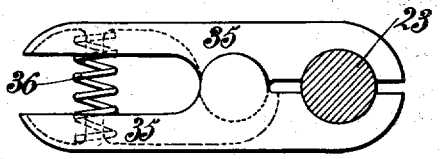
Figure 15:
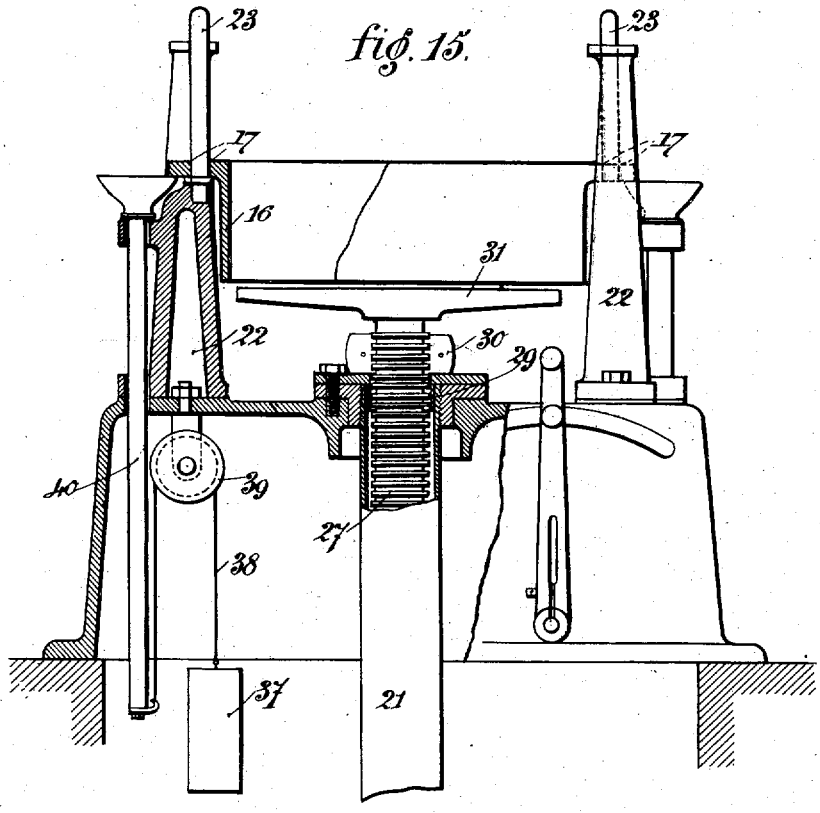

In the annexed drawings, Figure 1 is a front view of the machine, showing the base of the machine in section and a view of the pushing hydraulic ram and table. Figs. 2 and 3 are respectively a side elevation and a ground plan of the same machine. Figure 2[a] is a side elevation of mechanism for automatically controlling the water. Figure 4 is a plan of one form of rectangular molding-box to be used on the machine. Figure 5 is a plan of a modified form of rectangular molding-box. Figure 6 is a plan of one form of a circular molding-box to be used in the machine. Figure 7 is a plan of another form of circular molding-box. Figure 8 is a sectional elevation showing the manner of locating the lower section of the molding-box. Figure 9 is a similar view showing the first section of the molding-box lowered in position. Figure 10 is a similar view showing the two sections of the molding-box before they are brought together. Figure 11 is a similar view showing the two sections of the molding-box united. Figure 12 is a similar view showing the arrangement for discharging the contents of the molding-box. Figure 13 is a similar view showing the contents of the molding-box forced up or out. Figure 14 is a plan and horizontal section showing spring-pincers which may be used for holding the empty molding-boxes in elevated position on the studs. Figure 15 is a sectional elevation of the machine, showing the special device by means of which emptied molding-boxes are brought back to the top of the machine, whence they are easily picked up to be again used for another mold.

The molding-boxes 16, preferably used in this machine, bear two holes 17 17, drilled in flanges or side projections at a given distance always the same. The shape of these molding-boxes or flasks may vary according to the shape of the pattern; but each of them must carry on each side of these two holes 17 dissymmetric projections 18 and 19, as shown in Figure 4, the use of which will be explained later on.

The assembling-machine comprises, Figures 1, 2 and 3, a foundation-plate 20, on the center of which is fixed a hydraulic cylinder 21. At both sides of this foundation-plate are fixed two movable uprights 22, carrying in their centers long vertical studs or rods 23, on which parts of a molding-box containing a mold are engaged. These long studs must be perfectly parallel to each and to the axis of the hydraulic cylinder 21 and be in a vertical plane passing through that axis. Each upright 22 carries besides two seats 24 and 25, dissymmetric and arranged exactly as the aforesaid projecting parts 18 and 19 of the mold-boxes. These seats 24 and 25 are arranged so as to permit the projections 18 and 19 of the mold-boxes 16 to pass when these are engaged upon the studs 23 through their openings 17 with their parting-face upward; but when the mold-box 16 is engaged upon the studs 23 with its parting-face downward the projections 18 and 19 meet the seats 24 and 25 of the machine, upon which they rest. The dissymmetry of the projections and seats is sufficient to accomplish this result.

The hydraulic cylinder 21 carries a ram 26, the top part 27 of which is of a smaller diameter and screwed on a certain length. The shoulder 28 has for object to prevent the hydraulic ram from rising above a certain point in the striking-socket 29, which at the same time forms a guide for the part 27 of the ram. The screw part 27 of the hydraulic ram bears a nut 30, which is raised or lowered to allow of the limitation of the downstroke of the ram. The ram 26 also carries on its top a table 31, on which the molds are laid.

*Working of the Machine.*

*Assembling parts of a mold.*—The ram 25 being in the position shown in Figure 8, the lower part of the mold in the molding-frame 16 is brought up and laid on the table 31, with its parting-face upward, holes 17 17 engaging long studs 23 23. This being done, let the ram get down till the nut 30 rests upon the socket 29. The molding-frame and the mold 16 follow, guided by the long studs 23. Then take upper part of the mold in the molding-box 16 and place it on the machine-joint downward, the holes 17 17 engaging the long studs 23 23. In that position the upper part of the mold cannot get through for its dissymmetric projections 18 and 19 rest on the seats 24 and 25, Figure 10. Thus placed both parts of the mold are accurately disposed one above the other, their axis being in the plane passing through the axis of the ram 26 and long studs 23 23. Then if the ram 26 is caused to rise the lower part of the mold is brought perfectly true against top part, the mold is assembled, Figure 11, and has only to be taken away to have metal poured in.

Each support 22 is furnished at its upper part with a bolt 32, fitted in a horizontal opening in the support and jointed to an operating lever 33, which latter is jointed upon the support 22. The bolts 32 serve to engage the ears 18 of the upper frame, Figures 12 and 13, when this frame is so placed that the ears 18 and 19 rest, respectively, upon the seats 25 and 29 for unloading the frame, (removing the sand) in consequence of which the upper frame is then fixed and cannot be raised or lowered. The lower part of the mold or lower frame is then raised as for assembling, and when parts of mold are in contact the ram is made to rise farther up, thus forcing the block of sand out of the molding-box, Figure 13.

In pushing the mold or block of sand out of the molding-box when the table 31 escapes the lower frame this frame being set free tends to fall down, Figure 15, and to prevent it doing so an automatic device has been provided. This device consists mainly in balance-weights 37, fixed at the end of small wire ropes 38, passing round grooved pulleys 39, these wire ropes being tied at their other ends to vertically guided rods 40, the tops of which, engaging flanges 17 of the lower frame, by the action of the balance-weights exert a pressure under the flanges and hold this lower frame against the top one. The machine carries an arrangement similar on each side, as is represented in Figure 15, and the counterweights 37 are regulated so that their total weight should be greater than that of the mold-box 16 when it is empty, but also so that it should be less than this same mold-box when it is full of sand. By this means when the lower mold-box 16 full of sand is replaced upon the machine so that its ears rest upon the rods 40 it descends upon the plate 31 and carries the weights 37; but when after molding the mold-box 16 has been emptied these weights 37, heavier than it, maintain it elevated and prevent it falling, and this is automatically accomplished. The same object can also be attained by means of the following device, which is much simpler, but not automatic. On each pin 23 can be mounted spring-pincers, Figure 14, constituted by two arms 35 35, hinged together and having a spring 36 placed between their ends, so that the said spring has always the tendency to move the said ends apart, and thus to bring together the opposite ends on the corresponding pins 23. While the lower flask is being raised, the pincers are placed on the pins 23 by causing them to follow the lugs of the said flask, and as soon as the erecting or fitting together has been completed the pincers are left to themselves. By the expansion of the spring, which is fairly strong, the empty flask is held and cannot descend. Besides the shoulder 28 preventing the ram 26 from getting out of the hydraulic cylinder 21 a special device has been provided to limit its stroke according to the height of the molding-box 16 16 used in order to save water under pressure. To that effect table 30 carries a vertical rod 41, having a removable socket 42, adjustable. In its way up as soon as the parts of the mold are assembled or as soon as the table 30 escapes the top of the upper frame in extracting or pushing out the block of sand forming the mold the socket 42 strikes a lever 44, keyed on a shaft 45 of a cam 46, which commands the inlet-valve and closes it automatically. This device saves water under pressure and limits the expenses to the strict minimum. To bring down the ram 26 and the table 31, it suffices to pull a lever 47, opening the exhaust.

Having now particular described and ascertained the nature of my said invention and in what manner the same is to be performed, I declare that what I claim is:—

1. In a machine for assembling and for emptying foundry-flasks, the combination with a horizontal plate movable between the uprights of a frame, of two vertical rods fixed upon the said frame, dissymmetric seats on each side of said rods upon the said uprights, a hydraulic piston carrying the said horizontal plate, means for limiting the ascending and descending travel of the said piston, and means for retaining the lower mold-box after it has been emptied, substantially as above described and for the object specified.

2. In a machine for assembling and emptying foundry flasks, the combination with a horizontal plate movable between the uprights of the frame, of two vertical rods fixed upon the said frame, dissymmetric seats on each side of said rods upon the said uprights, a hydraulic piston having a head carrying the said horizontal plate, a cylinder for this piston, a socket closing this cylinder to guide the piston and serve as a seat for its head, a screw-nut upon the said piston below the horizontal plate, a rod fixed vertically under the said plate, a movable stop upon this rod, a conduit for water under pressure having an operating-lever controlled by said stop, and means for retaining the lower mold-box after it has been emptied, substantially as above described and for the object specified.

3. In a machine for assembling and emptying foundry-flasks, the combination with a horizontal plate movable between the uprights of a frame, of two vertical rods fixed upon said frame, dissymmetric seats on each side of said rods upon the said uprights, vertical rods guided on the exterior of the uprights, weights connected with these rods by cables, and grooved pulleys for carrying said cables, substantially as before described and for the object specified.

4. In a machine of the character herein set forth, lateral rods and dissymmetric seats, a mold-box having diametrically opposite ears with holes for admitting the lateral rods of the machine, and projections disposed dissymmetrically on each side of said ears and corresponding with the dissymmetric seats of the machine, combined substantially as above described and for the object specified.

5. In combination in an assembling machine, means for engaging and guiding opposing flask members vertically into proper alinement, means for holding the upper flask member against vertical movement in either direction and lifting means engaging the lower surface of the sand in the lower flask member and adapted to raise the lower flask up against the upper one and then force the assembled mold through the flasks.

6. In combination in an assembling machine, means for engaging and guiding opposing flask members vertically into proper alinement, means for holding the upper flask member against vertical movement in either direction, lifting means engaging the lower surface of the sand in the lower flask member and adapted to raise the lower flask up against the upper one and then force the assembled mold through the flasks and counterbalancing means for holding the lower flask member in elevated position after it has been emptied.

7. In combination in an assembling machine, guide means for engaging and guiding in vertical alinement a pair of flask members, a pair of similar flask members provided with stop seats, and stop means adjacent the guide means, the stop seats and stop means being so arranged that when the parting face of a flask member is down the stop seats and stop means engage and when the parting face is up the flask member may move down upon the guide means without the stop seats and stop means engaging.

In testimony whereof I have hereunto signed my name in the presence of the two subscribed witnesses.

PHILIBERT BONVILLAIN.

Witnesses:
DEAN B. MASON,
JULIEN EAUWCE.